United States Patent
Schemers et al.

(10) Patent No.: US 10,749,832 B1
(45) Date of Patent: Aug. 18, 2020

(54) METHODS AND APPARATUSES FOR MANAGING LIMITED ENGAGEMENT BY EXTERNAL EMAIL RESOURCE ENTITY WITHIN A GROUP-BASED COMMUNICATION SYSTEM

(71) Applicant: Slack Technologies, Inc., San Francisco, CA (US)

(72) Inventors: Roland Schemers, Woodside, CA (US); James McPhail, San Francisco, CA (US); Matthew Wahl, San Francisco, CA (US); Britton Jamison, San Francisco, CA (US); San Oo, San Francisco, CA (US)

(73) Assignee: Slack Technologies, Inc., San Francisco, CA (US)

( * ) Notice: Subject to any disclaimer, the term of this patent is extended or adjusted under 35 U.S.C. 154(b) by 32 days.

(21) Appl. No.: 16/263,804

(22) Filed: Jan. 31, 2019

(51) Int. Cl.
*H04L 12/58* (2006.01)

(52) U.S. Cl.
CPC .............. *H04L 51/22* (2013.01); *H04L 51/36* (2013.01)

(58) Field of Classification Search
None
See application file for complete search history.

(56) References Cited

U.S. PATENT DOCUMENTS

| | | | | |
|---|---|---|---|---|
| 6,725,228 B1 * | 4/2004 | Clark | .................. | G06Q 10/107 |
| 6,970,907 B1 * | 11/2005 | Ullmann | ............... | H04L 51/066 709/206 |
| 7,065,554 B1 * | 6/2006 | Kiyohara | ............. | G06Q 10/107 709/206 |
| 7,751,620 B1 * | 7/2010 | Cosoi | ...................... | H04L 51/12 382/168 |
| 7,945,627 B1 * | 5/2011 | Musat | .................. | G06Q 10/107 709/200 |
| 8,122,086 B1 * | 2/2012 | King | .................... | G06Q 10/107 709/206 |
| 8,533,274 B2 * | 9/2013 | Buchheit | .............. | G06Q 10/107 709/206 |
| 8,572,184 B1 * | 10/2013 | Cosoi | ..................... | H04L 51/12 709/206 |
| 8,621,022 B2 * | 12/2013 | Buchheit | ................ | G06Q 10/10 709/206 |
| 9,002,956 B1 * | 4/2015 | Karam | .................... | H04L 51/32 709/205 |
| 9,037,601 B2 * | 5/2015 | Palay | ..................... | H04L 51/16 707/769 |
| 9,906,485 B1 * | 2/2018 | Ku | ........................ | G06F 16/285 |
| 10,637,808 B2 * | 4/2020 | Mestanogullari | ..... | H04L 51/063 |

(Continued)

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

(Continued)

*Primary Examiner* — Backhean Tiv
(74) *Attorney, Agent, or Firm* — Erise IP, P.A.

(57) ABSTRACT

Method, system, apparatus, and computer program product for programmatically managing limited engagement by an external email resource entity with a group-based communication interface of a group-based communication system are described herein.

20 Claims, 10 Drawing Sheets

(56) References Cited

U.S. PATENT DOCUMENTS

| | | | |
|---|---|---|---|
| 2003/0028441 A1* | 2/2003 | Barsness | G06Q 30/0601 |
| | | | 705/26.1 |
| 2004/0044735 A1* | 3/2004 | Hoblit | G06Q 10/107 |
| | | | 709/206 |
| 2005/0171955 A1* | 8/2005 | Hull | H04L 51/12 |
| 2006/0069734 A1* | 3/2006 | Gersh | G06Q 10/107 |
| | | | 709/207 |
| 2006/0080161 A1* | 4/2006 | Arnett | G06F 21/31 |
| | | | 705/7.31 |
| 2006/0112036 A1* | 5/2006 | Zhang | G06F 16/353 |
| | | | 706/20 |
| 2006/0235933 A1* | 10/2006 | Baluja | H04L 51/26 |
| | | | 709/207 |
| 2007/0143236 A1* | 6/2007 | Huelsbergen | G06Q 10/107 |
| | | | 706/20 |
| 2007/0214216 A1* | 9/2007 | Carrer | G06Q 10/107 |
| | | | 709/204 |
| 2009/0070294 A1* | 3/2009 | Chijiiwa | H04L 67/36 |
| 2010/0030798 A1* | 2/2010 | Kumar | G06F 16/954 |
| | | | 707/737 |
| 2011/0010182 A1* | 1/2011 | Turski | H04L 51/08 |
| | | | 705/1.1 |
| 2011/0238409 A1* | 9/2011 | Larcheveque | G10L 15/1815 |
| | | | 704/9 |
| 2012/0124147 A1* | 5/2012 | Hamlin | G06N 5/025 |
| | | | 709/206 |
| 2014/0059141 A1* | 2/2014 | Belkin | H04L 51/12 |
| | | | 709/206 |
| 2014/0115067 A1* | 4/2014 | Rosenwald | G06Q 10/107 |
| | | | 709/206 |
| 2014/0120961 A1* | 5/2014 | Buck | H04W 4/14 |
| | | | 455/466 |
| 2014/0324982 A1* | 10/2014 | Agrawal | H04L 12/1831 |
| | | | 709/206 |
| 2014/0379818 A1* | 12/2014 | Cudak | H04L 51/16 |
| | | | 709/206 |
| 2015/0200879 A1* | 7/2015 | Wu | H04L 51/046 |
| | | | 715/758 |
| 2015/0358234 A1* | 12/2015 | Krieger | H04W 12/02 |
| | | | 709/235 |
| 2015/0370797 A1* | 12/2015 | Mishra | G06O 50/01 |
| | | | 707/748 |
| 2016/0080303 A1* | 3/2016 | Deolalikar | G06Q 10/107 |
| | | | 709/206 |
| 2016/0149849 A1* | 5/2016 | Lukacs | H04L 51/22 |
| | | | 709/206 |
| 2016/0156579 A1* | 6/2016 | Kaufmann | H04L 51/22 |
| | | | 709/206 |
| 2016/0156580 A1* | 6/2016 | Krka | H04L 51/14 |
| | | | 709/206 |
| 2016/0182414 A1* | 6/2016 | Mestanogullari | G06Q 40/04 |
| | | | 709/206 |
| 2016/0196561 A1* | 7/2016 | Iyer | G06Q 30/016 |
| | | | 705/304 |
| 2016/0364368 A1* | 12/2016 | Chen | G06Q 10/107 |
| 2017/0012913 A1* | 1/2017 | Lohani | H04L 67/22 |
| 2017/0155607 A1* | 6/2017 | Chakra | G06F 40/30 |
| 2017/0308523 A1* | 10/2017 | Wang | G06F 40/242 |
| 2018/0089152 A1* | 3/2018 | Maksak | G06F 40/117 |
| 2018/0181626 A1* | 6/2018 | Lyons | G06Q 30/0201 |
| 2018/0287982 A1* | 10/2018 | Draeger | H04L 51/16 |
| 2019/0028287 A1 | 1/2019 | Jin et al. | |
| 2019/0124024 A1* | 4/2019 | Oberg | G16H 40/20 |
| 2019/0163816 A1* | 5/2019 | Francis | G06N 20/00 |
| 2019/0327198 A1* | 10/2019 | Connor | H04L 51/32 |
| 2020/0137018 A1* | 4/2020 | Jamison | H04L 51/046 |

OTHER PUBLICATIONS

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", Pandodaily, Lexisnexis, https://advance.lexis.com/api/permalink/dd2d4ee5-2ddf-4d3a-ald9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

Matsumoto, T. et al., "Chocoa Communicator—A New Communication System Based on Awareness and Text Communications-", Fujitsu Sci. Tech. J., 36, 2, (Dec. 2000) 154-161.

PCT/US2020/015954; International Search Report and Written Opinion dated May 8, 2020.

"Bridging the Gap: Email & Slack—Mio—Medium", Feb. 7, 2018; Retrieved from the Internet: URL:https://medium.com/@messageio/bridging-the-gap-email-slack-c38elble869a.

Anonymous: "Guide to Slack notifications—Slack Help Center" Jan. 18, 2019, Retrieved from the Internet: URL: https://web.archive.org/web/20190118075321/https://get.slack.help/hc/en-us/articles/201355156-Guide-to-Slack-notifications.

* cited by examiner

Invite Members

Email Address — Full Name (optional)

- name@example.com — Optional
- name@example.com — Optional
- name@example.com — Optional ⊕ Add another or add many at once Default Channels 440 — (Email Address)
450 — (Default Channels)

METHODS AND APPARATUSES FOR MANAGING LIMITED ENGAGEMENT BY EXTERNAL EMAIL RESOURCE ENTITY WITHIN A GROUP-BASED COMMUNICATION SYSTEM

TECHNOLOGICAL FIELD

Embodiments of the invention relate, generally, to programmatically managing limited engagement by an external email resource entity with a group-based communication interface of a group-based communication system. Examples of limited engagement include receiving communication messages in a group-based communication channel, transmitting group-based communication messages for rendering for display within a group-based communication channel, and the like.

BACKGROUND

Various messaging systems may support communication and collaboration among users across an organization. Applicant has identified a number of deficiencies and problems associated with collaborative communication environments. Through applied effort, ingenuity, and innovation, many of these identified problems have been solved by developing solutions that are included in embodiments of the present disclosure, many examples of which are described in detail herein.

BRIEF SUMMARY

This specification relates to methods, systems, apparatuses, and computer program products for an apparatus configured to programmatically manage limited engagement by an external email resource entity with a group-based communication interface of a group-based communication system.

In some embodiments of the present disclosure, an apparatus may be provided for managing limited engagement by an external email resource entity with a group-based communication interface of a group-based communication system, the apparatus comprising at least a processor, and a memory associated with the processor having computer coded instructions therein, with the computer coded instructions configured to, when executed by the processor, cause the apparatus to at least receive a communication message of a channel message corpus associated with a group-based communication channel identifier. The communication message is associated with an external email resource entity identifier, the communication message comprising timestamp data. The memory including the program code is further configured to, with the processor, cause the apparatus to query a group-based communication repository to determine whether the external email resource entity identifier is associated with a limited profile of the group-based communication system. The limited profile comprises an external email resource entity identifier, at least one group identifier, at least one group-based communication channel identifier, and a limited user identifier. The memory including the program code is further configured to, with the processor, cause the apparatus to apply a limited engagement protocol to the communication message of the channel message corpus associated with the group-based communication channel identifier upon determining that the external email resource entity identifier is associated with a limited profile. The memory including the program code is further configured to, with the processor, cause the apparatus to transmit communication message data associated with the communication message to an external email resource address associated with the external email resource entity identifier for rendering by an external email resource as a hybrid email object.

In some embodiments, applying the limited engagement protocol further comprises comparing timestamp data associated with most recent two communication messages of one or more communication messages transmitted to identify time difference between transmitting the most recent two messages; and upon determining that the time difference between transmitting the most recent two communication messages satisfies a predefined message time threshold, transmitting communication message data comprising the two communication messages to the external email resource address associated with the external email resource entity identifier for rendering by an external email resource as a hybrid email object.

In some embodiments, applying the limited engagement protocol further comprises comparing timestamp data associated with a first communication message of one or more communication messages transmitted and timestamp data associated with a current time; and upon determining that the time difference between transmitting the first communication message of the one or more communication messages and the timestamp data associated with the current time satisfies a predefined message time threshold, transmitting communication message data comprising the one or more communication messages to the external email resource address associated with the external email resource entity identifier for rendering by an external email resource as a hybrid email object.

In some embodiments, applying the limited engagement protocol further comprises determining one or more conversation primitive identifiers for each communication message of one or more communication messages; and upon determining that the one or more conversation primitive identifiers are not identical, transmitting communication message data comprising the one or more communication messages to the external email resource address associated with the external email resource entity identifier for rendering by an external email resource as a hybrid email object.

In some embodiments, applying the limited engagement protocol further comprises determining a number of messages of one or more communication messages transmitted; and upon determining that the number of messages exceeds a pre-defined threshold, transmitting communication message data comprising the one or more communication messages to the external email resource address associated with the external email resource entity identifier for rendering by an external email resource as a hybrid email object.

In some embodiments, determining whether the communication message satisfies the limited engagement protocol comprises determining one or more sending user proximities between one or more user profiles associated with the one or more communication messages and the limited profile and upon determining that the one or more sending user proximities exceed a pre-defined threshold, transmitting communication message data comprising the one or more communication messages to the external email resource address associated with the external email resource entity identifier for rendering by an external email resource as a hybrid email object.

In some embodiments, the limited engagement protocol is identified by one or more of the group-based communication channel identifier, the group identifier, or a profile identifier associated with the limited profile.

In some embodiments, the computer coded instructions are configured to, when executed by the processor, further cause the apparatus to associate the external email resource entity identifier with at least one group-based communication interface identifier.

In some embodiments, the computer coded instructions are configured to, when executed by the processor, further cause the apparatus to receive a reaction notification associated with the hybrid email object, the reaction notification comprising a reaction identifier, a communication message identifier associated with the communication message, and the external email resource entity identifier; and render a message reaction associated with the external email resource entity within the group-based communication interface associated with the communication message.

In some embodiments, the reaction notification further comprises communication message data, and wherein the message reaction comprises the communication message data.

In some embodiments, the reaction notification further comprises a thread creation request, and wherein the message reaction is associated with a new thread associated with the group-based communication channel identifier associated with the communication message.

In another example embodiment, an apparatus is provided for programmatically managing limited engagement by an external email resource entity with a group-based communication interface of a group-based communication system, the apparatus comprising at least a processor, and a memory associated with the processor having computer coded instructions therein, with the computer coded instructions configured to, when executed by the processor, cause the apparatus to receive external message data from an external email resource address associated with an external email resource entity identifier. The external message data comprises at least one group identifier and at least one group-based communication channel identifier. The memory including the program code is further configured to, with the processor, cause the apparatus to query a group-based communication repository to determine whether the external email resource entity identifier is associated with a limited profile of the group-based communication system. The limited profile comprises an external email resource entity identifier, at least one group identifier, at least one group-based communication channel identifier, and a limited user identifier. The memory including the program code is further configured to, with the processor, cause the apparatus to render a communication message within a group-based communication interface associated with the at least one group identifier and the at least one group-based communication channel identifier upon determining that the external email resource entity identifier is associated with a limited profile.

In another example embodiment, a computer-implemented may be provided for programmatically managing limited engagement by an external email resource entity with a group-based communication interface of a group-based communication system, the method comprising receiving a communication message of a channel message corpus associated with a group-based communication channel identifier. The communication message is associated with an external email resource entity identifier, the communication message comprising timestamp data. The method further comprises querying a group-based communication repository to determine whether the external email resource entity identifier is associated with a limited profile of the group-based communication system. The limited profile comprises an external email resource entity identifier, at least one group identifier, at least one group-based communication channel identifier, and a limited user identifier. The method further comprises applying a limited engagement protocol to the communication message of the channel message corpus associated with the group-based communication channel identifier upon determining that the external email resource entity identifier is associated with a limited profile. The method further comprises transmitting communication message data associated with the communication message to an external email resource address associated with the external email resource entity identifier for rendering by an external email resource as a hybrid email object.

In some embodiments, applying the limited engagement protocol further comprises comparing timestamp data associated with most recent two communication messages of one or more communication messages transmitted to identify time difference between transmitting the most recent two messages; and upon determining that the time difference between transmitting the most recent two communication messages satisfies a predefined message time threshold, transmitting communication message data comprising the two communication messages to the external email resource address associated with the external email resource entity identifier for rendering by an external email resource as a hybrid email object.

In some embodiments, applying the limited engagement protocol further comprises comparing timestamp data associated with a first communication message of one or more communication messages transmitted and timestamp data associated with a current time; and upon determining that the time difference between transmitting the first communication message of the one or more communication messages and the timestamp data associated with the current time satisfies a predefined message time threshold, transmitting communication message data comprising the one or more communication messages to the external email resource address associated with the external email resource entity identifier for rendering by an external email resource as a hybrid email object.

In some embodiments, applying the limited engagement protocol further comprises determining one or more conversation primitive identifiers for each communication message of one or more communication messages; and upon determining that the one or more conversation primitive identifiers are not identical, transmitting communication message data comprising the one or more communication messages to the external email resource address associated with the external email resource entity identifier for rendering by an external email resource as a hybrid email object.

In some embodiments, applying the limited engagement protocol further comprises determining a number of messages of one or more communication messages transmitted; and upon determining that the number of messages exceeds a pre-defined threshold, transmitting communication message data comprising the one or more communication messages to the external email resource address associated with the external email resource entity identifier for rendering by an external email resource as a hybrid email object.

In some embodiments, determining whether the communication message satisfies the limited engagement protocol comprises determining one or more sending user proximities between one or more user profiles associated with the one or more communication messages and the limited profile and upon determining that the one or more sending user proximities exceed a pre-defined threshold, transmitting communication message data comprising the one or more communication messages to the external email resource address associated with the external email resource entity identifier for rendering by an external email resource as a hybrid email object.

In some embodiments, the limited engagement protocol is identified by one or more of the group-based communication channel identifier, the group identifier, or a profile identifier associated with the limited profile.

In some embodiments, the method further comprises associating the external email resource entity identifier with at least one group-based communication interface identifier.

In some embodiments, the method further comprises receiving a reaction notification associated with the hybrid email object, the reaction notification comprising a reaction identifier, a communication message identifier associated with the communication message, and the external email resource entity identifier; and render a message reaction associated with the external email resource entity within the group-based communication interface associated with the communication message.

In some embodiments, the reaction notification further comprises communication message data, and wherein the message reaction comprises the communication message data.

In some embodiments, the reaction notification further comprises a thread creation request, and wherein the message reaction is associated with a new thread associated with the group-based communication channel identifier associated with the communication message.

In yet another embodiment, a computer implemented method is provided for programmatically managing limited engagement by an external email resource entity with a group-based communication interface of a group-based communication system, the method comprises receiving external message data from an external email resource address associated with an external email resource entity identifier. The external message data comprises at least one group identifier and at least one group-based communication channel identifier. The method further comprises querying a group-based communication repository to determine whether the external email resource entity identifier is associated with a limited profile of the group-based communication system. The limited profile comprises an external email resource entity identifier, at least one group identifier, at least one group-based communication channel identifier, and a limited user identifier. The method further comprises rendering a communication message within a group-based communication interface associated with the at least one group identifier and the at least one group-based communication channel identifier upon determining that the external email resource entity identifier is associated with a limited profile.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
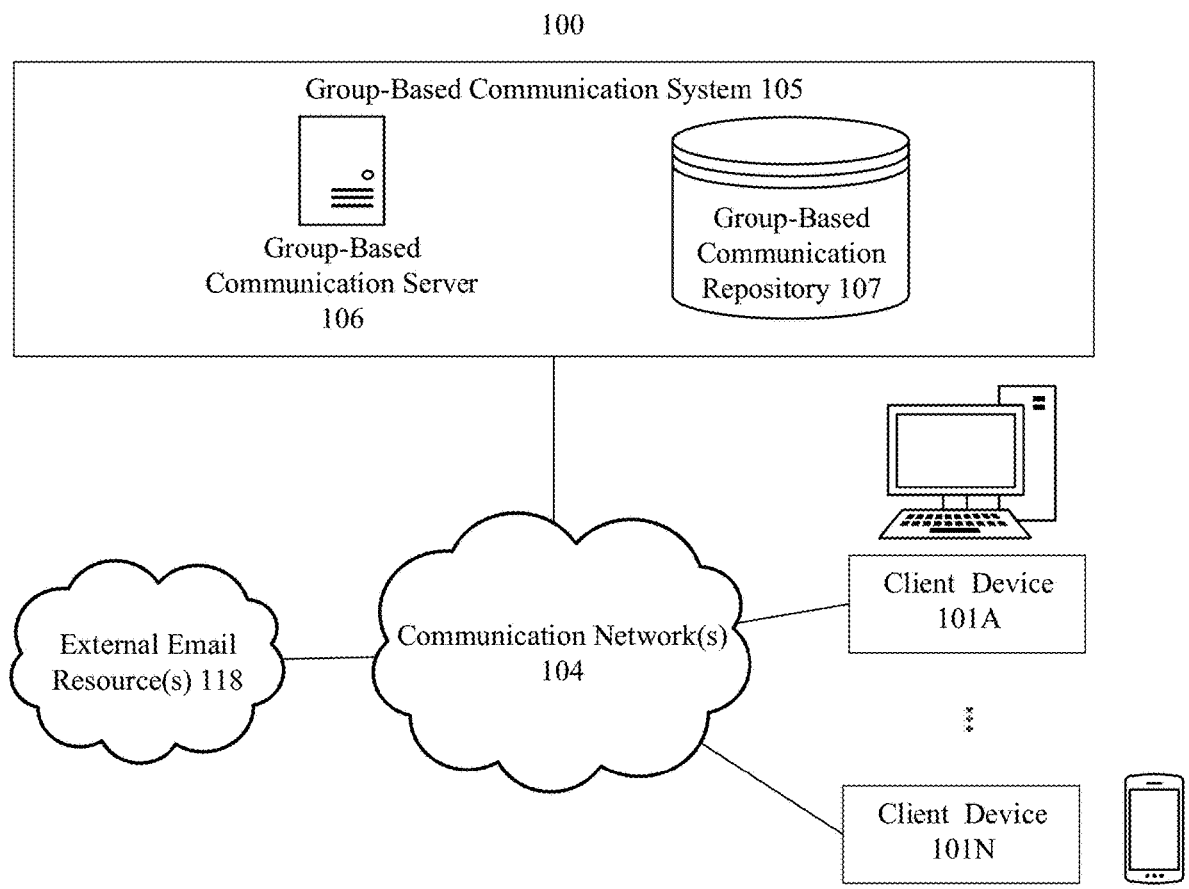
Figure 2:
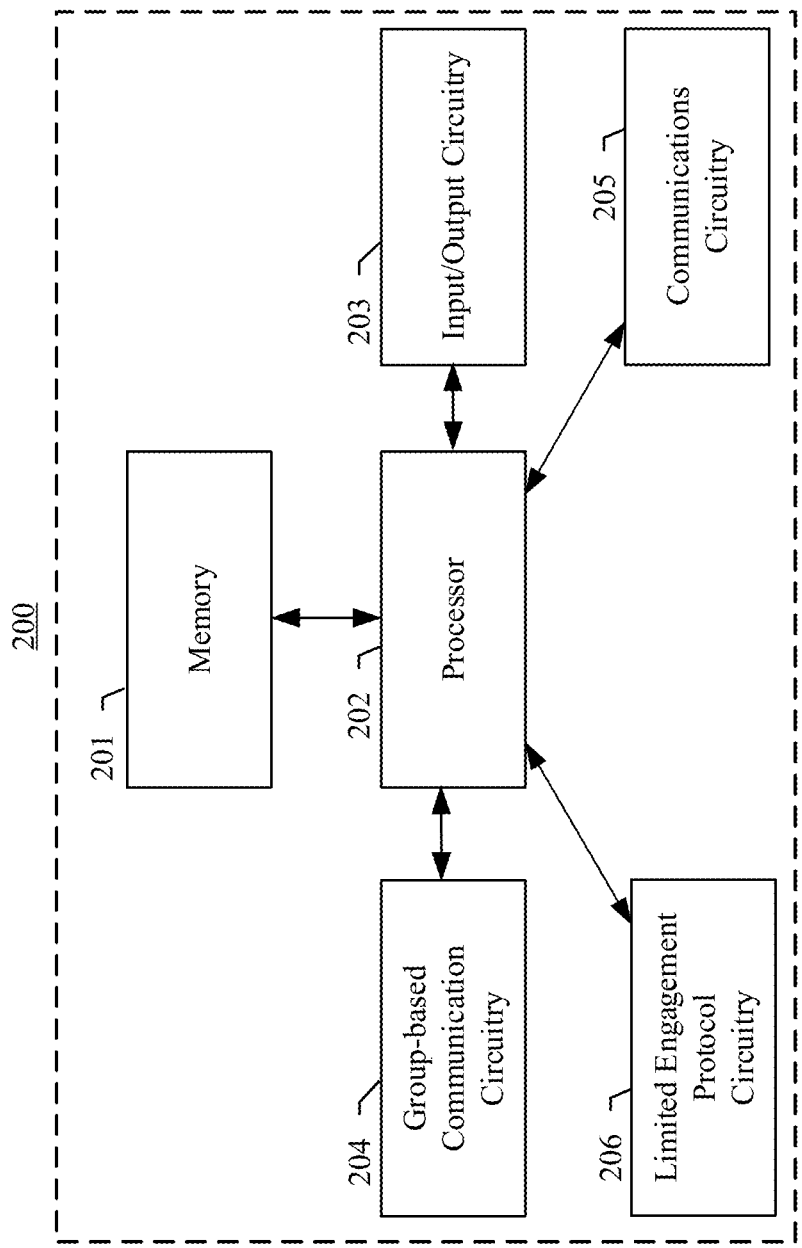
Figure 3:
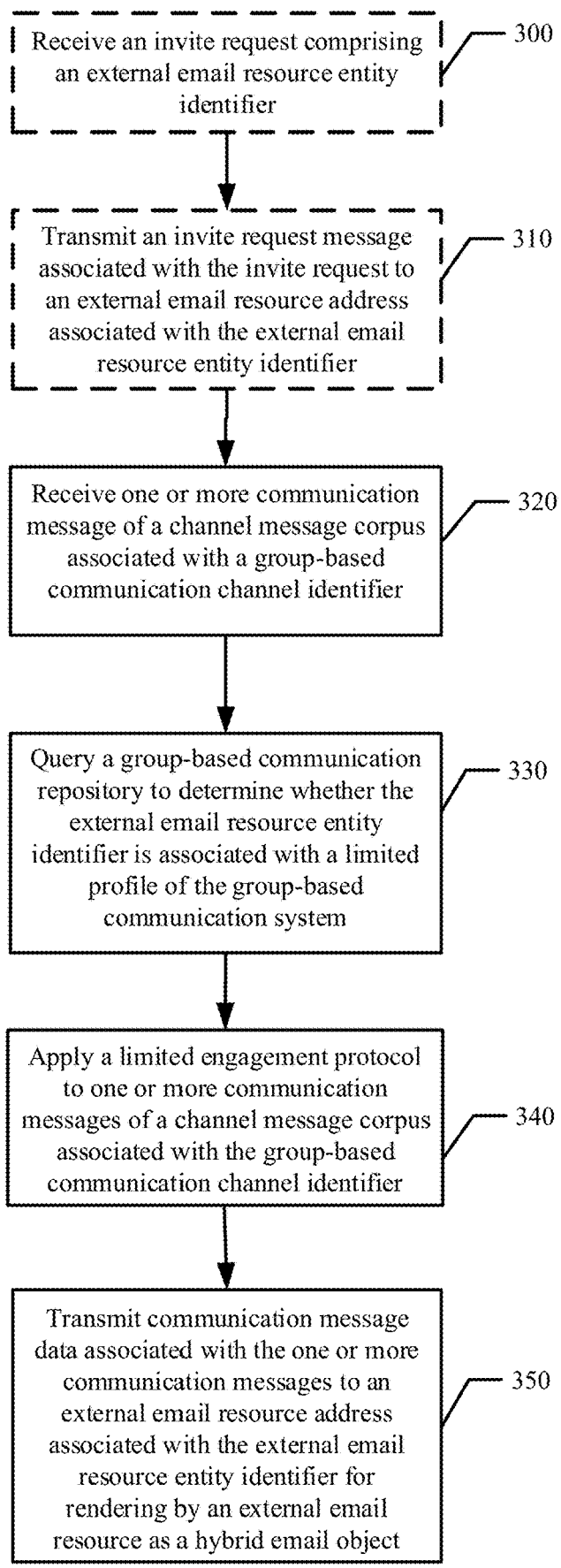
Figure 4A:
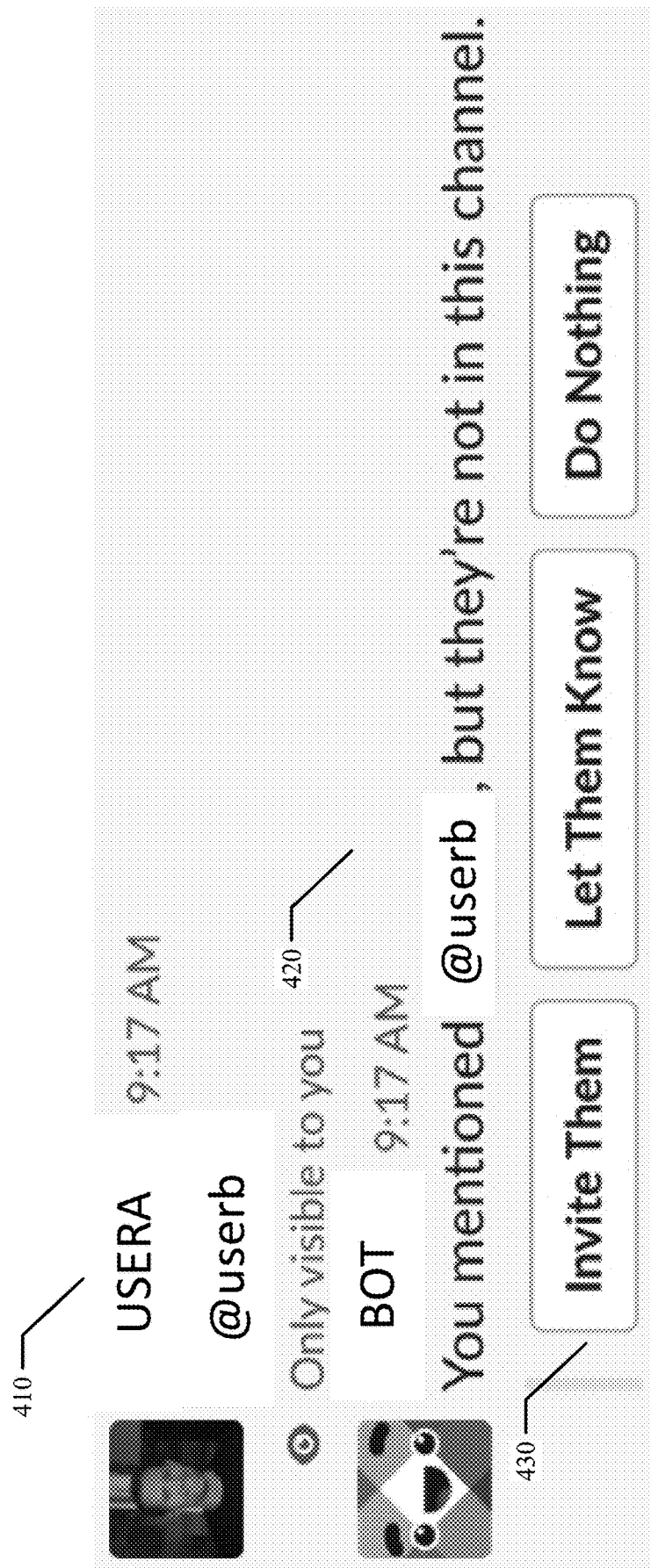
Figure 4C:
Figure 5:
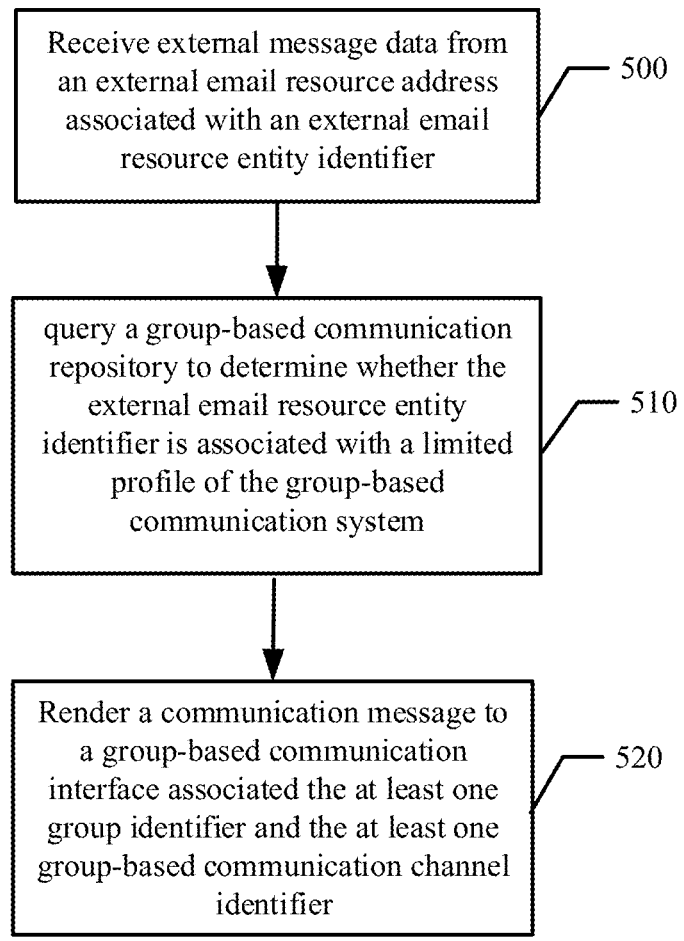
Figure 8:
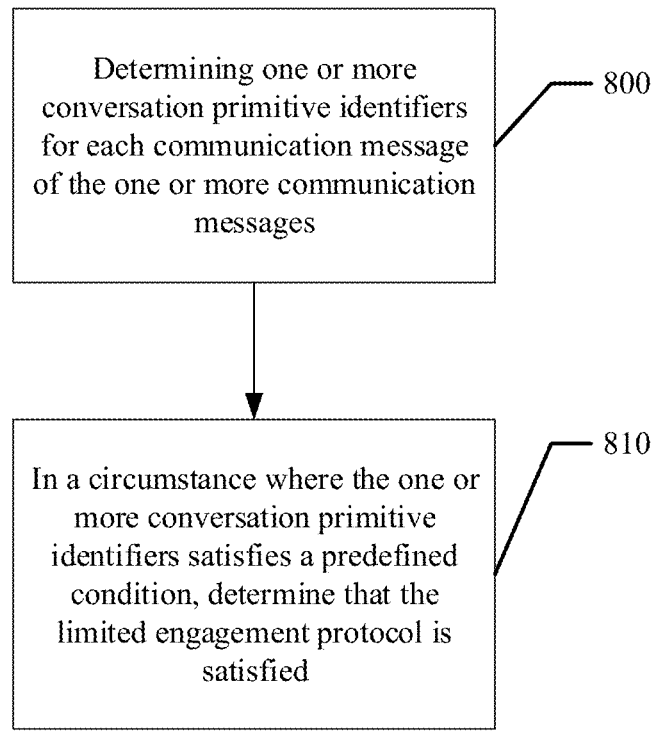
Figure 9:
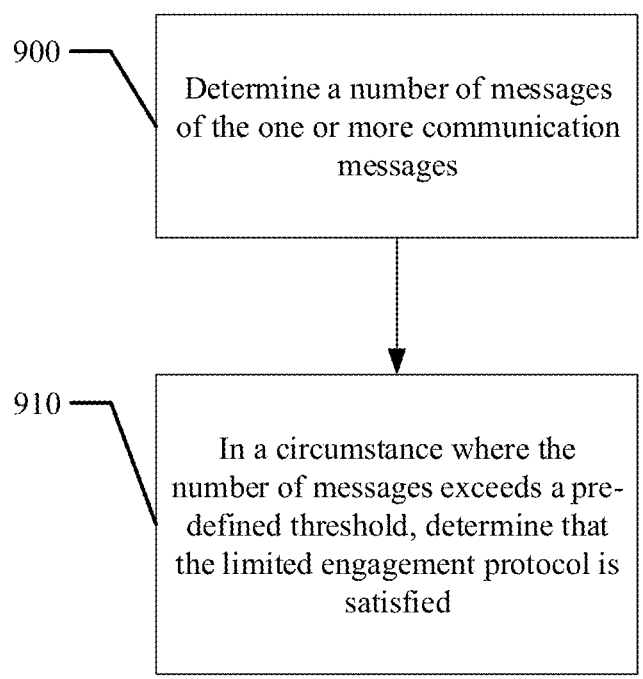
Figure 10:
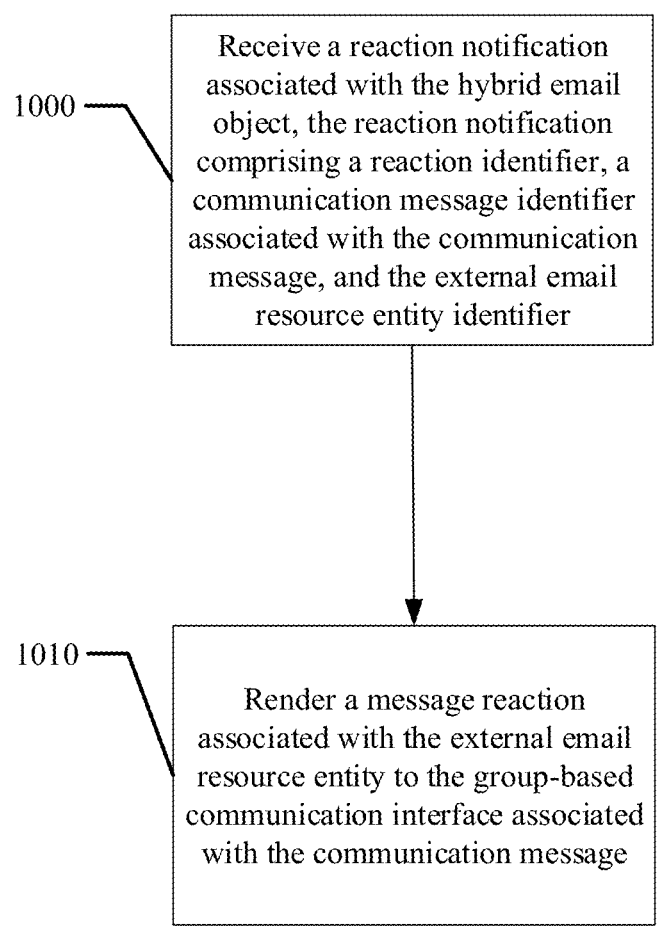

Having thus described the disclosure in general terms, reference will now be made to the accompanying drawings, which are not necessarily drawn to scale, and wherein:

FIG. 1 is a system architecture diagram of an exemplary group-based communication system configured to practice embodiments of the present disclosure;

FIG. 2 is a schematic diagram of an exemplary computing entity according to one embodiment of the present disclosure;

FIG. 3 is a flowchart illustrating operations that are executed by an exemplary group-based communication system for programmatically managing limited engagement by an external email resource entity with a group-based communication interface of a group-based communication system, according to embodiments of the present disclosure;

FIGS. 4A to 4C illustrate exemplary components of exemplary group-based communication interfaces for receiving user input associated with an invite request, according to embodiments of the present disclosure;

FIG. 5 is a flowchart illustrating operations that are executed by an exemplary group-based communication system for programmatically managing limited engagement by an external email resource entity with a group-based communication interface of a group-based communication system, according to embodiments of the present disclosure;

FIGS. 6 to 9 are flowcharts illustrating operations that are executed by an exemplary group-based communication system for applying a limited engagement protocol, according to embodiments of the present disclosure; and FIG. 10 is a flowchart illustrating operations that are executed by an exemplary group-based communication system for managing a reaction notification received from an external email resource, according to embodiments of the present disclosure.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the present disclosure generally relate to a method and apparatus for programmatically managing limited engagement by an external email resource entity with a group-based communication interface of a group-based communication system. Examples of limited engagement include receiving communication messages in a group-based communication channel, transmitting group-based communication messages to be rendered for display within a group-based communication channel, and the like.

Group-based communication system users are organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like).

Registered group-based communication system users who access group-based communication system using a group-based communication interface may be able to participate in discussions occurring in the one or more group-based communication channels.

However, within an organization, there may be users who are not registered group-based communication system users, and therefore may not access the group-based communication system via a group-based communication interface. To facilitate efficient usage of the group-based communication system, such users who are not registered group-based communication system users may be granted limited engagement by using external email resources. Managing such limited engagement is vital for ensuring efficient computing resource usage, efficient network bandwidth usage, security, and user engagement experience of the group-based communication system. For example, without an efficient mechanism for managing limited engagement, a group-based communication system may transmit communication message data to the external email resources too frequently, resulting in inefficient computing resource and network bandwidth usage due to an increase in network transmissions. Alternatively, a group-based communication system may transmit communication message data to the external email resources too infrequently, resulting in inefficient computing resource and network bandwidth usage due to large transmission size and processing time. Such inefficient computing resource and network bandwidth usage may interfere with other operations of the group-based communication system, which, in turn, lowers operational and computational stability of the group-based communication system.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like. Client devices may be associated with a user of a group-based communication system. The association may be created by way of the client device transmitting registration information for the user to a group-based communication system. In some instances, a client device may be temporarily associated with a user (e.g., only when a user is logged onto the group-based communication system app). In such embodiments, the group-based communication system may receive registration information indicating the user is associated with a client device (e.g., a user may input a serial number of the client device to be associated with the user into the group-based communication system).

Client devices configured in accordance with embodiments described herein are configured to generate geographic location data and/or contextual location data. The term "geographic location data" refers to location data (e.g., latitude and longitude coordinates) that is generated by a global positioning system (GPS) receiver housed within the client device. The GPS receiver receives clock data transmitted by one or more geostationary satellites (e.g., a satellite in a known or knowable position) and/or one or more ground based transmitters (e.g., also in known or knowable positions), compares the received clock data, and computes the geographic location data, which represents a near real-time position for the client device. The term "contextual location data" refers to position or location information that is derived by the client device (or by separate server) based on interactions between the client device and local networks, objects, or devices. Example contextual location data could be derived based on reference to known locations for Wi-Fi routers or Bluetooth devices that are configured to communicate with a client device. A client device may also generate contextual location information based on communicating with radio-frequency identification (RFID) readers or tags, or barcode readers or tags, having known positions.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation originated from one user who has been granted access to the group to another entity who has not been granted access to the group. Group identifiers are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface.

The term "group-based communication server" refers to a software platform and associated hardware that is configured to manage access to the various group-based communication interfaces of the group-based communication system. The group-based communication server is configured to access, maintain, and support application product logic of the group-based communication system and to access one or more data repositories such as a group-based communication repository.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like. Users referred to herein are discussed largely in connection with client device enabled activity for accessing a group-based communication interface (or set of group-based communication interfaces) of a group-based communication system.

The term "group based communication interface user" refers to a user accessing a group-based communication or messaging system by accessing a group-based communication interface using a client device.

The terms "group-based communication channel identifier" or "channel identifier" refer to one or more items of data by which a group-based communication channel may be uniquely identified by a group-based communication system. For example, a group-based communication channel identifier may comprise American Standard Code for Information Interchange (ASCII) text, a pointer, a memory address, and the like.

The terms "group identifier" or "team identifier" refer to one or more items of data by which a group within a group-based communication system may be uniquely identified. For example, a group identifier may comprise ASCII text, a pointer, a memory address, and the like. For example, the group identifier associated with member users of a Slack Corporation workspace (i.e., a group-based communication interface) may be 104356721.

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier is used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "group-based communication repository" refers to a location outside the client device where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data stored in a single remote location or a plurality of remote locations. Alternatively, in some embodiments, the group-based communication repository may be distributed over a plurality of remote storage locations only.

As used herein, the term "group-based communication message corpus" refers to a collection of communication messages in one or more workspaces. In some embodiments, a group-based communication message corpus is constructed by combining multiple channel message corpuses. In some embodiments, a channel message corpus is constructed by periodically collecting group-based communication messages based on timestamp data. In some embodiments, a channel message corpus is constructed by collecting group-based communication messages after a defined number of messages with identical group-based communication channel identifier or thread identifier is received. In some embodiments, a channel message corpus is constructed by collecting group-based communication messages after receiving a request (such as a user request) to construct a channel message corpus. In some embodiments, a channel message corpus is constructed by collecting group-based communication messages in a thread communication that initiated in a channel. In some embodiments, a channel message corpus is constructed in accordance with other construction criteria defined by a message corpus construction learning model.

A "thread" is a collection of message communications displayed to a subsidiary feed arising from or otherwise associated with a selected group-based communication message communication displayed in a selected group-based communication interface. A thread may include one or more "threaded messages" or "thread communication messages" that are linked together in the subsidiary feed, wherein each is associated with the selected group-based communication message.

As used herein, the term "channel message corpus" refers to a collection of one or more communication messages in a group-based communication channel. In some embodiments, a channel message corpus may include all communication messages in a group-based communication channel (i.e., all of the communication messages in the channel message corpus share a common group-based communication channel identifier). In some embodiments, channel message corpus are constructed based on a pre-defined trigger. In some embodiments, a channel message corpus is constructed by periodically collecting group-based communication messages based on timestamp data. In some embodiments, a channel message corpus may be edited by adding additional communication messages to the channel message corpus. In some embodiments, a channel message corpus is constructed by collecting group-based communication messages after a defined number of messages with identical group-based communication channel identifier is received. In some embodiments, a channel message corpus is constructed by collecting group-based communication messages after receiving a request (such as a user request) to construct a channel message corpus.

The term "external email resource" refers to a software program, application, platform, or service that is configured to provide electronic mail ("email") services to users operating client devices. The external email resource comprises an email client, a simple mail transfer protocol ("SMTP") server, and a domain name server ("DNS"). The external email resource is configured to allow a sending user ("a sender") to create and transmit an email message to a receiving user ("a recipient"). Each email message comprises an email envelope that defines its electronic format, an email header that includes sender/recipient information and an email subject line, and an email body that includes text, images, and file attachments. The external email resource operates on a compiled code base or repository that is separate and distinct from that which supports the group-based communication system. Example external email resources include Microsoft Office 365®, Gmail®, and Yahoo Mail®. An external email resource may be associated with several external email resource entities of one or more users.

An email client of the external email resource may be used by a sender to create and transmit an email message. The email message text and attachments are thus uploaded to the SMTP server as outgoing mail. A copy of the email message is stored to an email outbox associated with the sender for later retrieval. The SMTP server communicates with the DNS to find a recipient email server using recipient information drawn from the email header. Once the SMTP server finds the recipient email server, it transfers the email message to the recipient email server. The next time the recipient accesses the email client, the email client downloads the email message from the recipient email server for presentation to the recipient in an email inbox interface. The external email resource may also include programs, applications, platforms, or services configured to provide services related to providing email services.

An external email resource may receive "communication message data" associated with a group-based communication message from the group-based communication system. The communication message data may be templated or structured template information that is consistent with the email client that is to receive this data. The communication message data may be rendered as a hybrid email object by an email client. As used herein, the term "hybrid email object" refers to data rendered by an email client that includes text, emoji, or other data originated from a group-based communication system. As used herein, the term "email resource engagement data" refers to data reflecting user input representing an attempt to render text, emoji, links, or the like included in the hybrid email object. An external email resource may transmit an invite request confirmation to the group-based communication system based on engagement from a limited user with an email client associated with an external email resource entity associated with the external email resource. An external email resource may also transmit "external message data" comprising a group identifier and a group-based communication channel identifier to a group-based communication system. The group-based communication system may parse the external message data and render, within a group-based communication interface, a group-based communication message based on the external message data to the group-based communication channel identified by the group-based communication channel identifier in the external message data.

In some embodiments, an external email resource may transmit a "reaction notification" as an electronic response to a hybrid email object previously transmitted from the group based communication system to the external email resource.

The term "external email resource entity identifier" refers to one or more items of data by which a user of an external email resource (i.e., a limited user) may be uniquely identified by a group-based communication system. For example, an external email resource entity identifier may comprise American Standard Code for Information Interchange (ASCII) text, a pointer, a memory address, and the like. One or more external email resource entity identifiers may be stored to a limited profile of a group-based communication system along with other identifiers (e.g., user identifier, group identifiers, group-based communication channel identifiers, etc.). The external email resource entity identifier may be embodied in a format native to the external email resource with which it is associated or may be structured in a format designated by the group-based communication system. Associating one or more external email resource entity identifiers with a user account or user identifier of the group-based communication system allows the group-based communication system to link accounts from disparate external email resources with a selected group-based communication system user account.

The term "limited user" refers to a user who interacts, via a client device, with a group-based communication system by accessing an external email resource address associated with an external email resource. A limited user may be associated with a "limited user identifier," which comprises one or more items of data by which the limited user may be uniquely identified. In embodiments, a limited user is also associated with an external email resource entity identifier.

The terms "user profile," "user account," "regular user profile", and "user account details" refer to data, files, and other information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, a graphical representation, an email address, a real name (e.g., John Doe), a username (e.g., jdoe), a password, a time zone, a status, and the like. The user account details can include a subset designation of user credentials, such as, for example, login information for the user including the user's username and password.

The term "limited profile" refers to a user profile associated with a limited user. A limited profile may include for example, a limited user identifier, an external email resource entity identifier, one or more group-based communication channel identifiers associated with group-based communication channels that the limited user has been granted access to, one or more group identifiers for groups with which the limited user is associated, an indication as to whether the limited user has any group-based communication channel restrictions, a plurality of messages, a plurality of conversations, a plurality of conversation topics, a graphical representation, an external email resource entity identifier, an external email resource address, a real name (e.g., John Doe), a user name, a time zone, a status, and the like. A user name associated with a limited profile may be automatically generated by the group-based communication system based on the external email resource address in the limited profile. In some embodiments, a limited profile may become a regular user profile after an invite request confirmation is received from the external email resource identified by the external email resource entity identifier associated with the limited profile. In some embodiments, a limited profile may become a regular user profile after an invite request confirmation is received from the external email resource identified by the external email resource entity identifier associated with the limited profile and after detecting an attempt associated with the limited profile to access a group-based communication system via a group-based communication interface. In some embodiments, if no attempt to access a group-based communication system via a group-based communication interface associated with the user profile is detected for a pre-defined period of time, the user profile may be temporarily reverted to limited profile and the group-based communication system.

The term "limited engagement" refers to engagement or electronic interaction between a limited user and a group-based communication system. Limited engagement may include, for example, receiving communication message data generated based on communication messages from a group-based communication channel via an external email resource, submitting requests for group-based communication messages to be rendered within a group-based communication interface by transmitting external message data to a group-based communication system via an external email resource, transmitting a reaction notification to the group-based communication system via an external email resource, and the like.

The term "communication message data" refers to data generated based on group-based communication messages by a group-based communication system and transmitted to an external email resource address. Communication message data may include text, emoji, links, or the like from one or more group-based communication messages. As mentioned above, an external email resource may render communication message data as a hybrid email object that includes the text, emoji, links, or the like from the one or more group-based communication messages. In some embodiments, communication message data may further include a tracking pixel. As used herein, the term "tracking pixel" refers to an image within an email that is associated with embedded code that is automatically loaded/executed when the email is rendered for display by an email client. The embedded code may be configured to establish a connection between the email client and the group-based communication system after the embedded code is loaded/executed.

Communication message data may be templated or structured information that is consistent with the email client that is to receive this data.

The term "external message data" refers to data transmitted from the external email resource address to the group-based communication system that includes text, emoji, links, or the like to be rendered as a communication message in a group-based communication interface associated with at least one group-based communication channel identifier included in the external message data. The links may correspond to integrations within the group-based communication system.

The term "reaction notification" refers to data transmitted from an external email resource associated with a limited profile of the group-based communication system in response to communication message data previously transmitted from the group-based communication system to the external email resource. In some embodiments, the reaction notification may be based on an user engagement with a hybrid email object rendered based on the communication message data previously transmitted from the group-based communication system to the external email resource, such as a hybrid email object that includes text, emoji, links, or the like from one or more group-based communication messages. In some embodiments, the user engagement may include user input instructing an external email resource to transmit a reply to the hybrid email object to the group-based communication system. In some embodiments, the user engagement may include user input reflecting an attempt to render text, emoji, links, or the like included in the hybrid email object. In some embodiments, the user input reflecting an attempt to render text, emoji, links, or the like included in the hybrid email object may be detected by a tracking pixel included in the hybrid email object.

As used herein, the term "limited engagement protocol" refers to a set of rules that define the conditions (i.e., logic for making selections) for managing limited users' engagement with a group-based communication system. In some embodiments, a limited engagement protocol includes a set of rules defining conditions for selecting one or more communication messages in a group-based communication channel for transmission to an external email resource address associated with a limited user profile. In some embodiments, the limited engagement protocol may be based on time, topics discussed in one or more group-based communication messages and/or proximity (e.g., message send order proximity, message send time proximity, and/or sending user identifier proximity) of the group-based communication messages. In some embodiments, a limited engagement protocol may be associated with a limited profile and may be configurable by the limited user. In some embodiments, a limited engagement protocol may be associated with a group-based communication channel. Different limited engagement protocols may be associated with different group-based communication channels. In some embodiments, a limited engagement protocol may be associated with both the limited profile and the group-based communication channel.

As used herein, the term "message send order proximity" refers to a proximity measure for messages associated with the same channel identifier determined based on a number of group-based communication messages with the same channel identifier having timestamp data associated therewith that falls between those timestamps associated with two or more messages in the same group-based communication channel.

As used herein, the term "message send time proximity" refers to a proximity measure determined based on difference of time in timestamp data associated with two or more group-based communication messages in the same group-based communication channel.

As used herein, the term "sending user identifier proximity" refers to a proximity measure determined based on one or more user profiles of one or more sending user of two or more communication messages and the limited profile of a limited user. In some embodiments, sending user identifier proximity may also be determined based on one or more communication messages associated with the user profiles. For example, if numerous communication messages associated the one or more sending user of two or more communication messages and the limited profile of a limited user shares the same channel identifier and has high message send time proximity and message send order proximity, the user profiles and the limited profile may be determined to have high sending user identifier proximity.

As used herein, the term "conversation segment" refers to a set of communication messages grouped by a server in a group-based communication system where all communication messages within the conversation segment are determined to have at least one identical conversation primitive identifier. In some embodiments, communication messages in one conversation segment are directed to the same topic. In some embodiments, a set of communication messages in one conversation segment may be thread communication messages in one particular thread. In some embodiments, the set of communication messages in one conversation segment may be non-thread communication messages that shares the same topic. In some embodiments, the set of communication messages in one conversation segment has message send order proximity, message send time proximity, and sending user identifier proximity that exceeds a respective defined threshold.

As used herein, the term "conversation primitive identifier" refers to an element used to analyze, index, store, communication messages. In one embodiment, a conversation primitive identifier may be determined based on analysis of topics discussed in the communication message and other communication messages (e.g., in the same channel or thread) and/or proximity (e.g., message send order proximity, message send time proximity, and/or sending user identifier proximity) of these messages. In another embodiment, a conversation primitive identifier may be determined based solely on message send order proximity, message send time proximity, and/or sending user identifier proximity.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example group-based communication system 105 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107. Client devices 101A-101N may interact peer-to-peer or may interact through group-based communication server 106 and group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, a 902.11, 902.16, 902.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers. The group-based communication server 106 may provide for receiving of electronic data from various sources, including but not necessarily limited to the client devices 101A-101N. For example, the group-based communication server 106 may be operable to transmit and receive: communication message data, external message data, requests, invitations, communications, external email resource identifiers, user profiles, reaction notifications or the like to or from the client devices 101A-101N, and/or the external email resources 118. The group-based communication server 106 may be configured to programmatically manage limited engagement by an external email resource entity, a group-based communication interface of a group-based communication system. In some embodiments, the group-based communication server 106 may be in communication with the group-based communication repository 107 through the communication network 104 or otherwise. In some embodiments, the group-based communication server 106 may determine the data to be rendered to a group-based communication interface for one or more regular user profiles associated with one or more regular users and/or one or more limited profiled associated with one or more limited users.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of requests, invitations, communications, identifiers, and the like organized within the group-based communication repository 107. For example, a group-based communication system 105, such as the group-based communication server 106 may store communication message data, external message data, requests, invitations, communications, external email resource identifiers, user profiles, reaction notifications or the like, on the group-based communication repository 107. In some embodiments, the group-based communication repository 107 may be in communication with the group-based communication server 106 through the communication network 104. In some embodiments, the group-based communication repository 107 and the group-based communication server 106 may be contained in the group-based communication system 105.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an example group-based communication system 105, group-based communication messages, requests, invite request confirmations, external email resource identifiers, other identifiers such as group-based communication channel identifier, group identifier, or email resource entity identifier, user profiles, reaction notifications or the like, and the like may be sent from a client device 101A-101N to a group-based communication system 105. In various implementations, the communication messages, requests, invite request confirmation, external email resource identifiers, other identifiers such as group-based communication channel identifier, group identifier, or email resource entity identifier, user profiles, reaction notifications, or the like may be sent to the group-based communication system 105 over communications network 104 directly by a client device 101A-101N, the communication messages, requests, invite request confirmation, external email resource identifiers, other identifiers such as group-based communication channel identifier, group identifier, or email resource entity identifier, user profiles, reaction notifications, or the like may be sent to the group-based communication system 105 via an intermediary such as an intermediate server or another client device 101A-101N, and/or the like. For example, the client device 101A-101N may be a desktop, a laptop, a tablet, a smartphone, and/or the like that is executing a client application (e.g., a group-based communication app). In one implementation, the communication messages, requests, invite request confirmation, external email resource identifiers, other identifiers such as group-based communication channel identifier, group identifier, or email resource entity identifier, user profiles, reaction notifications, or the like may include data such as a client device identifier, sending user identifier, a group identifier, a group-based communication channel identifier, external email resource entity identifier, user-provided data embedded within a communication message, profile data, template data used for rendering a group-based communication interface, email resource engagement data, messaging communication data, third party metadata, and/or the like. In some embodiments, some of the data may be provided by the external email resource(s) 118.

In an example embodiment, the group-based communication system 105 may also be connected to, or in communication with, one or more external email resources 118. The group-based communication system 105, such as the group-based communication server 106, may be in communication with the one or more external email resources 118 through the communication network 104. As discussed above, the group-based communication system 105 may be configured to receive one or more reaction notifications that include email resource engagement data from one or more external email resources 118.

The email resource engagement data transmitted by the external email resource(s) may include data reflecting user input instructing an email client to transmit a reply to the hybrid email object to the group-based communication system. In some embodiments, the email resource engagement data may include data reflecting user input representing an attempt to render text, emoji, links, or the like included in the hybrid email object. In some embodiments, after the email client receives the user input representing an attempt to render text, emoji, links, or the like included in the hybrid email object, a tracking pixel included in the hybrid email object may attempt to establish connection with the group-based communication system. The email resource engagement data may be transmitted as a reaction notification.

In some embodiments, the group-based communication system 105 may be configured to receive an external email resource entity identifier from the external email resource 118. The external email resource entity identifier may include information associated with a limited user. The group-based communication system may determine a limited profile to which the information from an external email resource is associated. The external email resource entity identifier may be provided as an email address, identification number, or the like.

Example Group-Based Communication System Configuration

The group-based communication system, including the client devices 101A-101N and/or group-based communication server 106, may be embodied by one or more computing systems and include one or more components shown in circuitry 200 shown in FIG. 2. The circuitry 200 may include a processor 202, a memory 201, input/output circuitry 203, communications circuitry 205, and limited engagement protocol circuitry 206. The circuitry 200 may, in some embodiments, also include the group-based communication repository 107. In some embodiments, the group-based communication repository may be stored on the memory 201. The circuitry 200 may be configured to execute the operations described herein. Although these components 107 and 201-206 are described with respect to functional limitations, it should be understood that the particular implementations necessarily include the use of particular hardware. It should also be understood that certain of these components 106 and 201-206 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the circuitry 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, identifiers, requests, communications, or the like, for enabling the apparatus to carry out various functions in accordance with example embodiments of the present disclosure.

The memory 201 may include a non-volatile computer-readable storage medium such as a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the circuitry 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the circuitry 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system 105. The group-based communication circuitry 204 may utilize processing circuitry, such as the processor 202, to perform these actions. The group-based communication circuitry 204 may send and/or receive data from group-based communication repository 107. In some implementations, the sent and/or received data may be of enterprise-based digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

The limited engagement protocol circuitry 206 includes hardware configured to apply a limited engagement protocol which supports the operations of the group-based communication system 105. The limited engagement protocol circuitry 206 may utilize processing circuitry, such as the processor 202, to perform these actions. It should also be appreciated that, in some embodiments, the group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Group-Based Communication System Operations

Referring now to FIG. 3, a flowchart is provided to illustrate operations that are executed by an example embodiment of an apparatus used to embody various components of the group-based communication system 105, such as the group-based communication server 106, for programmatically managing limited engagement by an external email resource entity with a group-based communication interface of a group-based communication system. FIG. 3 and other flowcharts herein are for illustrative purposes and are not to be limiting unless otherwise stated herein. Unless otherwise noted, various operations discussed in FIG. 3 and other flowcharts may be used in the same or separate embodiments of the present disclosure.

As shown in optional Block 300 of FIG. 3, the apparatus includes means, such as the communications circuitry 205, processor 202, or the like, for receiving an invite request comprising an external email resource entity identifier. The invite request may be transmitted from a client device 101A to 101N associated with a user of the group-based communication channel. The invite request indicates that the external email resource entity identified by the external email resource entity identifier is invited to become a limited user of the group-based communication system. In some embodiments, the invite request may be automatically generated by the group-based communication system as part of a bulk invite comprising invite request messages to one or more, and in some embodiments, all external email resource entity identifiers associated with an external email resource.

The invite request may be encrypted. In some embodiments, an invite request may include a group identifier and/or group-based communication channel identifier. In some embodiments, invite requests that include group-based communication channel identifiers associated with certain pre-defined high security group-based communication channels may be accepted only if the invite request is transmitted from a client device that satisfies a pre-defined security protocol. For example, such pre-defined security protocol may define that only client devices associated with certain pre-approved user profiles, such as owners of a channel, satisfy the protocol. In some embodiments, an invite request message can only be sent to an external email resource that is associated with one or more users in the channel.

As shown in optional Block 310 of FIG. 3, the apparatus includes means, such as the communications circuitry 205, processor 202, or the like, for transmitting an invite request message associated with the invite request to an external email resource address associated with the external email resource entity identifier. The invite request message may include the external email resource address. The invite request message may be transmitted to the external email resource 118; the external email resource 118 may then parse the invite request message and identify the external email resource entity identified by the external email resource entity identifier. An email client associated with the external email resource entity identified by the external email resource entity identifier may render for display the invite request message. The apparatus may further associate the external email resource entity identifier with least one group identifier and at least one group-based communication channel identifier. In some embodiments, the at least one group identifier and the at least one group-based communication channel identifier may be included in the invite request message. In some embodiments, the external email resource entity identifier is also determined to be associated with at least one group-based communication interface identifier.

In some embodiments, the group-based communication system may automatically identify the at least one group identifier and the at least one group-based communication channel identifier based on at least one group identifier and the at least one group-based communication channel identifier associated with the user profile associated with the client device initiating the invite request message. In some embodiments, the group-based communication system may automatically identify the at least one group identifier and the at least one group-based communication channel identifier based on a group-based communication channel associated with a group-based communication interface rendered with a user selection field associated with the invite request message.

The apparatus includes means, for storing the external email resource entity identifier, the at least one group identifier, and the at least one group-based communication channel identifier to a limited profile of the group-based communication system. Limited profile is a user profile associated with a limited user, as defined above. A limited profile may include, for example, a limited user identifier, one or more group-based communication channel identifiers associated with group-based communication channels that the user has been granted access to, one or more group identifiers for groups with which the user is associated, an indication as to whether the user has any group-based communication channel restrictions, a plurality of messages, a plurality of conversations, a plurality of conversation topics, a graphical representation, an external email resource entity identifier, an external email resource address, a real name (e.g., John Doe), a user name, a time zone, a status, and the like. The one or more group-based communication channel identifiers associated with group-based communication channels that the user has been granted access to may be the same as the at least one group-based communication channel identifier previously identified/provided. In some embodiments, the limited profile may be stored in the group-based communication repository 107.

As shown in Block 320 of FIG. 3, the apparatus includes means, such as the communications circuitry 205, processor 202, or the like, for receiving one or more communication messages of a channel message corpus associated with a group-based communication channel identifier. The communication message is associated with an external email resource entity identifier, the communication message comprising timestamp data.

As shown in Block 330 of FIG. 3, the apparatus includes means, such as the communications circuitry 205, processor 202, or the like, for querying a group-based communication repository to determine whether the external email resource entity identifier is associated with a limited profile of the group-based communication system.

As shown in Block 340 of FIG. 3, the apparatus includes means, such as the processor 202, memory 201, limited engagement protocol circuitry 206, or the like, for applying a limited engagement protocol to the one or more communication messages upon determining that the external email resource entity identifier is associated with a limited profile. In some embodiments, applying the limited engagement protocol comprises comparing the timestamp data associated with the invite request message that indicates the time where the invite request message is transmitted with timestamp data associated with the one or more communication messages to determine whether the timestamp data associated with the one or more communication messages all indicate an earlier time than the timestamp data associated with the invite request message. In some embodiments, if the timestamp data associated with the one or more communication messages do not all indicate an earlier time than the timestamp data associated with the invite request message, the limited engagement protocol is not satisfied.

As defined above, an limited engagement protocol is a set of rules that define the conditions for managing limited users' engagement of the group-based communication system In some embodiments, limited engagement protocol may be developed by a limited engagement protocol learning model. In some embodiments, the limited engagement protocol learning model may be one or a combination of: a random forests learning model, a logistic regression learning model, neural networks, or the like. In some embodiments, the limited engagement protocol learning model may utilize data parsed from reaction notifications, group-based communication messages, and other data related to one or more limited user profiles as training data. In some embodiments, the limited engagement protocol learning model may provide or modify one or more of the thresholds discussed in conjunction with FIGS. 6-9. In some embodiments, limited engagement protocol learning model may consider various factors, including but not limited to, the time period in which a user is most likely to have active engagement with emails, the typical time between a user's response to messages and topic of the message, and the like. These factors may be determined based on past data and used with a logistic regression, neural network, or other models to predict likelihood of a user responding to a particular message in a particular time window. The group-based communication system may adjust the limited engagement protocol accordingly to maximize the likelihood of response but at the same time to minimize sending too many messages in a short time.

As defined above, a channel message corpus a collection of one or more communication messages associated with a group-based communication channel. In some embodiments, channel message corpus are constructed based on a pre-defined trigger. In some embodiments, a channel message corpus is constructed by periodically collecting group-based communication messages based on timestamp data. In some embodiments, a channel message corpus may be edited by adding additional communication messages to the channel message corpus. In some embodiments, a channel message corpus is constructed by collecting group-based communication messages after a defined number of messages with identical group-based communication channel identifier is received. In some embodiments, a channel message corpus is constructed by collecting group-based communication messages after receiving a request (such as a user request) to construct a channel message corpus. In some embodiments, the channel message corpus includes all group-based communication messages having in common a group-based communication identifier with the channel.

In some embodiments, the apparatus may apply the limited engagement protocol to more than one communication message of the channel message corpus. Whether to apply the limited engagement protocol to more than one communication message may be defined by the limited engagement protocol. For example, the limited engagement protocol may define that the limited engagement protocol need to be applied to all communication messages rendered. Examples of applying the limited engagement protocol are illustrated in FIGS. 6-9.

As shown in Block 350 of FIG. 3, the apparatus includes means, such as the processor 202, memory 201, communications circuitry 205, or the like, for transmitting communication message data associated with the one or more communication messages an external email resource address associated with the external resource entity identifier for rendering by an external email resource as a hybrid email object in a circumstance where the communication message satisfies the limited engagement protocol. Communication message data is data generated based on the one or more group-based communication messages from the group-based communication channel by the group-based communication system. Communication message data may include text, emoji, links, or the like from the one or more group-based communication messages. In some embodiments, communication message data may further include a tracking pixel. Communication message data may be templated or structured template information that is consistent with the email client that is to receive this data.

Operations 320 to 350 may be repeated after new group-based communication messages are received by the group-based communication system 105. In some embodiments, the limited engagement protocol may be applied after a defined number of new group-based communication messages with the group-based communication channel identifier are identified. In some embodiments, the limited engagement protocol may be applied after a pre-defined period of time.

Example Group-Based Communication Interfaces

FIG. 4A illustrates an example component inside a group-based communication interface that may be engageable by a user to provide user input for an invite request. In an example embodiment, the group-based communication system 105 may receive selection input(s) from a client device associated with the user initiating the invite request. In the example embodiment illustrated, the client device associated with the user identified by the user identifier 410 transmitted and rendered a group-based communication message mentioning an identifier that is not a member of the group-based communication channel or the group based communication system. Upon identifying such message, the group-based communication system 105 transmits for rendering within a group-based communication interface a group-based communication message 420 that includes a selection field 430 that is engageable to provide selection input with regard to whether to invite a new limited user. In some embodiments, the user identified by the user identifier 410 may need to provide the external email resource entity identifier to be associated with the invite request. In some embodiments, a group identifier and a group-based communication channel identifier may be automatically identified by the group-based communication system based on the group-based communication channel identifier associated with the group-based communication interface rendered.

FIG. 4B illustrates another example interface that may be prompted or presented/transmitted by a group-based communication interface that may be engageable by a user to provide user input for an invite request. In an example embodiment, the group-based communication system 105 may receive user input(s) from a client device associated with the user initiating the invite request. In the example embodiment illustrated, the user may provide one or more external email resource entity identifiers (Email Addresses in the illustrated example) in the input field 440. Optionally, the user may also provide an identifier associated with the limited user to be invited (real name in the illustrated example). The user may also provide one or more group-based communication channel identifiers in the input field 450.

FIG. 4C illustrates yet another example interface that may be prompted or presented/transmitted by a group-based communication interface that may be engageable by a user to provide user input for an invite request. In an example embodiment, the group-based communication system 105 may receive user input(s) from a client device associated with the user initiating the invite request. In the example embodiment illustrated, the user may provide one or more external email resource entity identifiers (Email Addresses in the illustrated example) in the input field 460. Optionally, the user may also input a message to the limited user in input field 470.

Additional Example Group-Based Communication System Operations

Referring now to FIG. 5, a flowchart is provided to illustrate operations that are executed by an example embodiment of an apparatus used to embody various components of the group-based communication system 105, such as the group-based communication server 106, for programmatically managing limited engagement by an external email resource entity with a group-based communication interface of a group-based communication system.

As shown in Block 500 of FIG. 5, the apparatus includes means, such as the processor 202, memory 201, communications circuitry 205, or the like, for receiving external message data from the external email resource address associated with the external resource entity identifier. The external message data comprises at least one group identifier and at least one group-based communication channel identifier. The external message data may also comprise text, emojis, or the like to be rendered within a group-based communication interface.

As shown in Block 510 of FIG. 5, the apparatus includes means, such as the communications circuitry 205, processor 202, or the like, for querying a group-based communication repository to determine whether the external email resource entity identifier is associated with a limited profile associated with the group-based communication channel identifier of the group-based communication system. In some embodiments, the external email resource entity identifier would be considered as associated with a limited profile of the group-based communication system if the external message data includes a unique identifier associated with the limited profile, such as a special email address associated with the group-based communication system that is created for the limited engagement.

As shown in Block 520 of FIG. 5, the apparatus includes means, such as the processor 202, memory 201, communications circuitry 205, or the like, for transmitting a communication message for rendering within a group-based communication interface associated with the at least one group identifier and the at least one group-based communication channel identifier. The communication message rendered may be formatted according to the format of other group-based communication messages. In some embodiments, the communication message rendered may include a note that indicates the communication message is originated from a limited user. In some embodiments, a username generated based on the external email resource entity identifier, such by parsing the external email resource entity identifier, may also be rendered with the communication message.

Referring now to FIGS. 6-9, FIGS. 6-9 illustrates examples of applying various example possible rules in the limited engagement protocol. Note that the rules in the limited engagement protocol may be combined, weighted according to various predefined models, removed, and added. The rules in the limited engagement protocol may be defined based on the limited user profile, the group-based communication channel, and/or the group associated with the limited engagement protocol.

Figure 6:
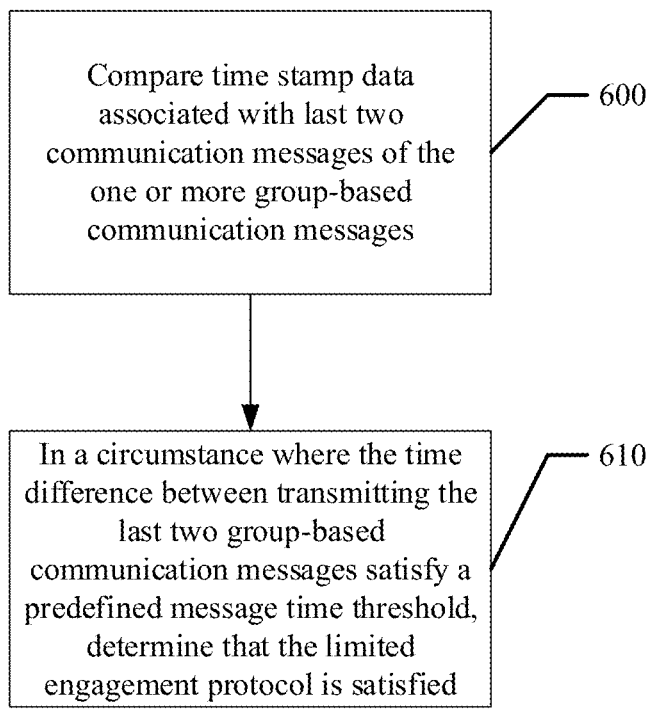

Referring now to FIG. 6, as shown in Block 600 of FIG. 6, the apparatus includes means, such as the processor 202, memory 201, or the like, for comparing timestamp data associated with most recent two communication messages of the one or more communication messages that have not been transmitted to the external email resource address associated with the external email resource entity identifier as communication message data. In some embodiments, the apparatus identifies the most recent two communication messages of the one or more communication messages by comparing timestamp data associated with first of the one or more communication messages. In some embodiments, the apparatus stores an ordered list that indicates the chronological order associated with transmission of communication message data and communication messages. The ordered list may be utilized to identify the most recent two communication messages of the one or more communication messages.

As shown in Block 610 of FIG. 6, the apparatus includes means, such as the processor 202, memory 201, or the like, for determining that the limited engagement protocol is satisfied in a circumstance where the time difference between rendering the most recent two group-based communication messages satisfies a predefined message time threshold. For example, in some embodiments, if the time difference between rendering the most recent two group-based communication messages exceeds a predefined message time threshold of 1 hour, the apparatus may determine that the limited engagement protocol is satisfied. In some embodiments, an additional requirement is that the text emojis, or the like in the most recent two group-based communication message rendered are not already transmitted to the external email resource as part of communication message data.

Figure 7:
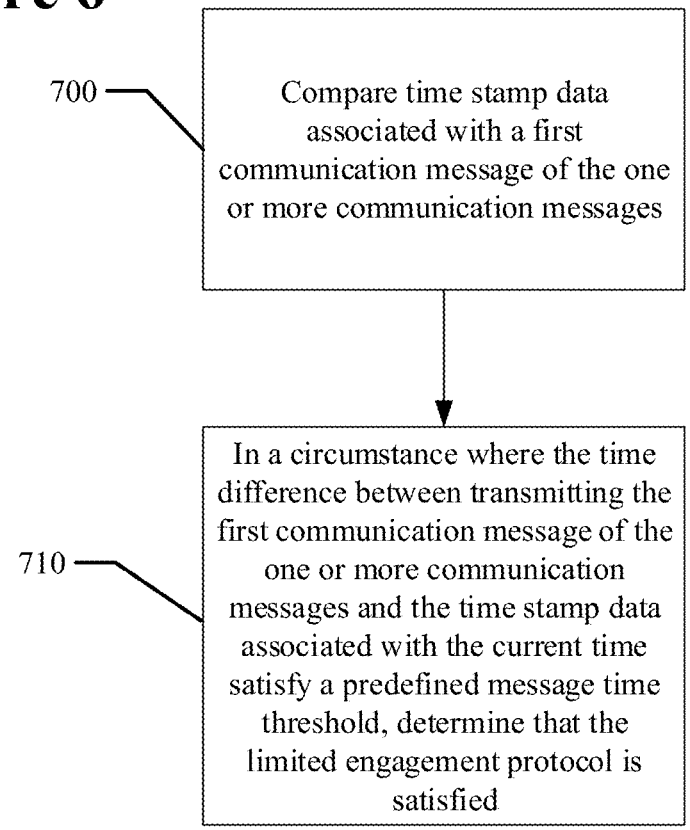

Referring now to FIG. 7, as shown in Block 700 of FIG. 7, the apparatus includes means, such as the processor 202, memory 201, or the like, for comparing timestamp data associated with a first communication message of the one or more communication messages that have not been transmitted to the external email resource address associated with the external email resource entity identifier as communication message data and timestamp data associated with a current time. In some embodiments, the apparatus identifies the first communication messages of the one or more communication messages rendered by comparing timestamp data associated with each of the one or more communication messages. In some embodiments, the apparatus stores an ordered list that indicates the chronological order associated with transmission of communication message data and communication messages. The ordered list may be utilized to identify the first message of the one or more communication messages.

As shown in Block 710 of FIG. 7, the apparatus includes means, such as the processor 202, memory 201, or the like, for determining that the limited engagement protocol is satisfied in a circumstance where a time difference between rendering the first communication message of the one or more communication messages and the timestamp data associated with the current time satisfies a predefined message time threshold. For example, in some embodiments, if the time difference between rendering the first communication message of the one or more communication messages and the timestamp data associated with the current time exceeds a predefined message time threshold of 1 hour, the apparatus may determine that the limited engagement protocol is satisfied.

Referring now to FIG. 8, as shown in Block 800 of FIG. 8, the apparatus includes means, such as the processor 202, memory 201, or the like, for determining one or more conversation primitive identifiers for each communication message of the one or more communication messages that have not been transmitted to the external email resource address associated with the external email resource entity identifier as communication message data.

As shown in Block 810 of FIG. 8, the apparatus includes means, such as the processor 202, memory 201, or the like, for determining that the limited engagement protocol is satisfied in a circumstance where the one or more conversation primitive identifiers. For example, in some embodiments, if the conversation primitive identifiers are not identical, which indicates that the one or more communication messages are not part of the same conversation, the apparatus may determine that the limited engagement protocol is satisfied.

Referring now to FIG. 9, as shown in Block 900 of FIG. 9, the apparatus includes means, such as the processor 202, memory 201, or the like, for determining a number of messages of the one or more communication messages that have not been transmitted to the external email resource address associated with the external email resource entity identifier as communication message data.

As shown in Block 910 of FIG. 9, the apparatus includes means, such as the processor 202, memory 201, or the like, for determining that the limited engagement protocol is satisfied in a circumstance where the number of messages exceeds a pre-defined threshold. For example, in some embodiments, if there are more than 20 communication messages rendered, the apparatus may determine that the limited engagement protocol is satisfied.

In some embodiments, determining whether the communication message satisfies the limited engagement protocol comprises determining one or more sending user proximities between one or more user profiles associated with the one or more communication messages and the limited profile. If the limited profile and the one or more user profiles associated with the one or more communication messages have sending user proximities exceeding a pre-determined sending user proximity threshold, the group-based communication system may determine that the limited engagement protocol is satisfied. A sending user identifier proximity is a proximity measure determined based on how closely related the sending users/limited of two or more communication messages in the same group-based communication channel are. The sending user identifier proximity may be calculated by adding, or otherwise calculated according to a pre-defined or learning model provided formula, a set of sending user proximity intermediary values generated based on various metadata associated the user profile. For example, if there are three common workspaces shared between the sending users for two messages, sending user proximity intermediary values for common workspaces would be equal to 30. If there are seven common channels shared between the sending users, sending user proximity intermediary values for common channels would be equal to 14. As a result, in some embodiments, the sending user identifier proximity for the sending users for the two messages would be 30+14=44.

Referring now to FIG. 10, a flowchart is provided to illustrate operations that are executed by an example embodiment of an apparatus, for managing reaction notifications received from the external email resource.

As shown in Block 1000 of FIG. 10, the apparatus includes means, such as the communications circuitry 205, processor 202, or the like, for receiving a reaction notification associated with the hybrid email object, the reaction notification comprising a reaction identifier which is a unique identifier associated with the reaction notification, a communication message identifier associated with the communication message, and the external email resource entity identifier. s As shown in Block 1010 of FIG. 10, the apparatus includes means, such as the communications circuitry 205, processor 202, or the like, for transmitting a message reaction associated with the external email resource entity for rendering within the group-based communication interface associated with the communication message. The message reaction may take the form of text, emojis, creation of thread communication message, or the like. The message reaction may be formatted according to the format of a group-based communication message.

In some embodiments, the limited engagement protocol associated with the limited profile may be adjusted based on the reaction notification. For example, if the group-based communication system detects a higher ratio of reaction notification received divided by communication message data transmitted, the group-based communication system may adjust the limited engagement protocol to transmit the communication message data to the external email resource address more frequently. The group-based communication system may adjust the limited engagement protocol by adjusting the thresholds described in conjunction with FIGS. 6-9.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As described above, FIGS. 3, and 5-10 illustrate flowcharts of apparatuses and methods according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for programmatically managing limited engagement by an external email resource entity with a group-based communication interface of a group-based communication system, the apparatus comprising at least a processor, and a memory associated with the processor having computer coded instructions therein, with the computer coded instructions configured to, when executed by the processor, cause the apparatus to:

receive a communication message of a channel message corpus associated with a group-based communication channel identifier, wherein the communication message is associated with an external email resource entity identifier, the communication message comprising timestamp data;

query a group-based communication repository to determine whether the external email resource entity identifier is associated with a limited profile of the group-based communication system, wherein the limited profile comprises an external email resource entity identifier, at least one group identifier, at least one group-based communication channel identifier, and a limited user identifier;

upon determining that the external email resource entity identifier is associated with a limited profile, apply a limited engagement protocol to the communication message of the channel message corpus associated with the group-based communication channel identifier; and transmit communication message data associated with the communication message to an external email resource address associated with the external email resource entity identifier for rendering by an external email resource as a hybrid email object.

2. The apparatus of claim 1, wherein applying the limited engagement protocol further comprises:

comparing timestamp data associated with most recent two communication messages of one or more communication messages associated with the group-based communication channel identifier to identify a time difference between transmissions of the most recent two communication messages; and upon determining that the time difference between transmissions of the most recent two communication messages satisfies a predefined message time threshold, transmitting communication message data comprising the most recent two communication messages to the external email resource address associated with the external email resource entity identifier for rendering by an external email resource as a hybrid email object.

3. The apparatus of claim 1, wherein applying the limited engagement protocol further comprises:

comparing timestamp data associated with a transmission of a first communication message of one or more communication messages and timestamp data associated with a current time; and upon determining that the time difference between the transmission of the first communication message of the one or more communication messages and the timestamp data associated with the current time satisfies a predefined message time threshold, transmitting communication message data comprising the one or more communication messages to the external email resource address associated with the external email resource entity identifier for rendering by an external email resource as a hybrid email object.

4. The apparatus of claim 1, wherein applying the limited engagement protocol further comprises:

determining one or more conversation primitive identifiers for each communication message of one or more communication messages; and upon determining that the one or more conversation primitive identifiers are not identical, transmitting communication message data comprising the one or more communication messages to the external email resource address associated with the external email resource entity identifier for rendering by an external email resource as a hybrid email object.

5. The apparatus of claim 1, wherein applying the limited engagement protocol further comprises:

determining a number of communication messages of one or more communication messages transmitted; and upon determining that the number of communication messages exceeds a pre-defined threshold, transmitting communication message data comprising the one or more communication messages to the external email resource address associated with the external email resource entity identifier for rendering by an external email resource as a hybrid email object.

6. The apparatus of claim 1, wherein determining whether the communication message satisfies the limited engagement protocol comprises:

determining one or more sending user proximities between one or more user profiles associated with one or more communication messages and the limited profile; and upon determining that the one or more sending user proximities exceeds a pre-defined threshold, transmitting communication message data comprising the one or more communication messages to the external email resource address associated with the external email resource entity identifier for rendering by an external email resource as a hybrid email object.

7. The apparatus of claim 1, wherein the limited engagement protocol is associated with one or more of the group-based communication channel identifier, the group identifier, or the limited profile.

8. The apparatus of claim 1, wherein the computer coded instructions are configured to, when executed by the processor, further cause the apparatus to:

associate the external email resource entity identifier with at least one group-based communication interface identifier.

9. The apparatus of claim 1, wherein the computer coded instructions are configured to, when executed by the processor, further cause the apparatus to:

receive a reaction notification associated with the hybrid email object, the reaction notification comprising a reaction identifier, a communication message identifier associated with the communication message, and the external email resource entity identifier; and transmit a message reaction associated with the external email resource entity renderable within the group-based communication interface associated with the communication message.

10. The apparatus of claim 9, wherein the reaction notification further comprises communication message data, and wherein the message reaction comprises the communication message data.

11. A computer-implemented method for programmatically managing limited engagement by an external email resource entity with a group-based communication interface of a group-based communication system, the method comprising:

receiving a communication message of a channel message corpus associated with a group-based communication channel identifier, wherein the communication message is associated with an external email resource entity identifier, the communication message comprising timestamp data;

querying a group-based communication repository to determine whether the external email resource entity identifier is associated with a limited profile of the group-based communication system, wherein the limited profile comprises an external email resource entity identifier, at least one group identifier, at least one group-based communication channel identifier, and a limited user identifier;

upon determining that the external email resource entity identifier is associated with a limited profile, applying a limited engagement protocol to the communication message of the channel message corpus associated with the group-based communication channel identifier; and transmitting communication message data associated with the communication message to an external email resource address associated with the external email resource entity identifier for rendering by an external email resource as a hybrid email object.

12. The computer-implemented method of claim 11, wherein applying the limited engagement protocol further comprises: comparing timestamp data associated with most recent two communication messages of one or more communication messages associated with the group-based communication channel identifier to identify a time difference between transmissions of the most recent two communication messages; and upon determining that the time difference between transmissions of the most recent two communication messages satisfies a predefined message time threshold, transmitting communication message data comprising the most recent two communication messages to the external email resource address associated with the external email resource entity identifier for rendering by an external email resource as a hybrid email object.

13. The computer-implemented method of claim 11, wherein applying the limited engagement protocol further comprises: comparing timestamp data associated with a transmission of a first communication message of one or more communication messages and timestamp data associated with a current time; and upon determining that the time difference between the transmission of the first communication message of the one or more communication messages and the timestamp data associated with the current time satisfies a predefined message time threshold, transmitting communication message data comprising the one or more communication messages to the external email resource address associated with the external email resource entity identifier for rendering by an external email resource as a hybrid email object.

14. The computer-implemented method of claim 11, wherein applying the limited engagement protocol further comprises: determining one or more conversation primitive identifiers for each communication message of one or more communication messages; and upon determining that the one or more conversation primitive identifiers are not identical, transmitting communication message data comprising the one or more communication messages to the external email resource address associated with the external email resource entity identifier for rendering by an external email resource as a hybrid email object.

15. The computer-implemented method of claim 11, wherein applying the limited engagement protocol further comprises: determining a number of communication messages of one or more communication messages transmitted; and upon determining that the number of communication messages exceeds a pre-defined threshold, transmitting communication message data comprising the one or more communication messages to the external email resource address associated with the external email resource entity identifier for rendering by an external email resource as a hybrid email object.

16. The computer-implemented method of claim 11, wherein applying the limited engagement protocol further comprises: determining one or more sending user proximities between one or more user profiles associated with one or more communication messages and the limited profile; and upon determining that the one or more sending user proximities exceeds a pre-defined threshold, transmitting communication message data comprising the one or more communication messages to the external email resource address associated with the external email resource entity identifier for rendering by an external email resource as a hybrid email object.

17. The computer-implemented method of claim 11, wherein the limited engagement protocol is associated with one or more of the group-based communication channel identifier, the group identifier, or the limited profile.

18. The computer-implemented method of claim 11, further comprising: associating the external email resource entity identifier with at least one group-based communication interface identifier.

19. The computer-implemented method of claim 11, wherein the computer coded instructions are configured to, when executed by the processor, further cause the apparatus to: receiving a reaction notification associated with the hybrid email object, the reaction notification comprising a reaction identifier, a communication message identifier associated with the communication message, and the external email resource entity identifier; and transmitting a message reaction associated with the external email resource entity for rendering within the group-based communication interface associated with the communication message.

20. The computer-implemented method of claim 19, wherein the reaction notification further comprises communication message data, and wherein the message reaction comprises the communication message data.

* * * * *